H. A. HEYNE.
PERCOLATOR.
APPLICATION FILED APR. 28, 1913.
1,106,045.
Patented Aug. 4, 1914.
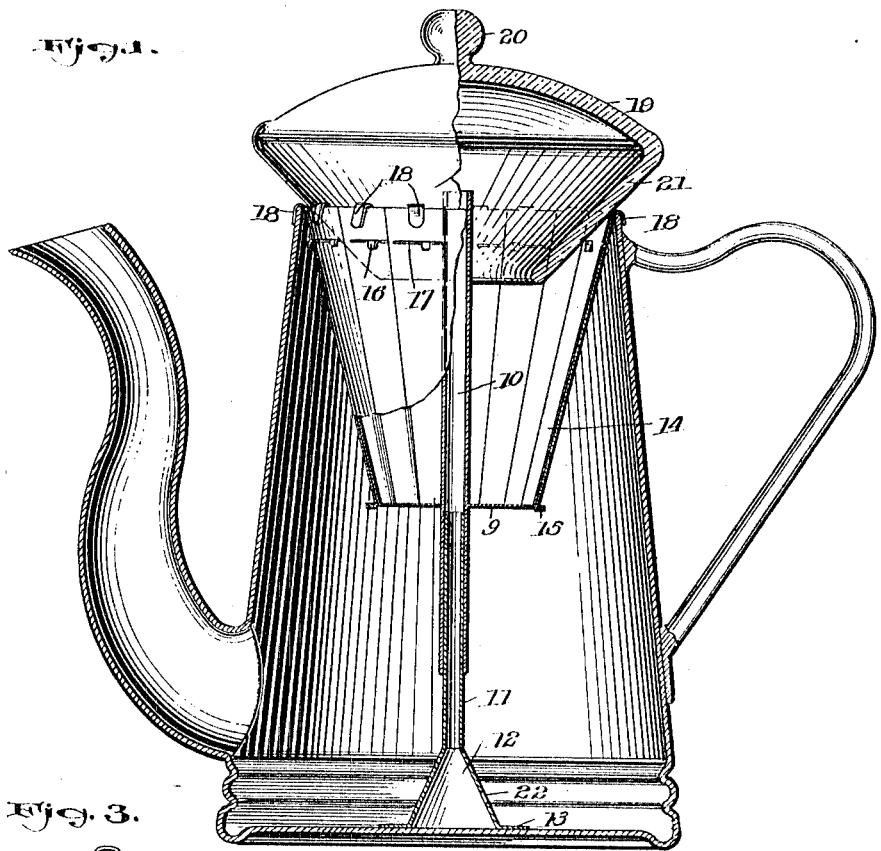
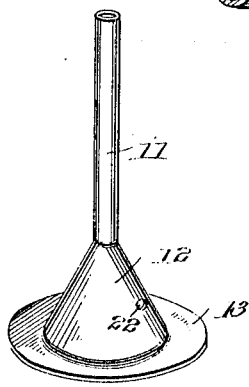
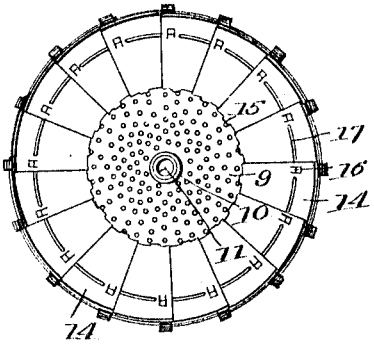
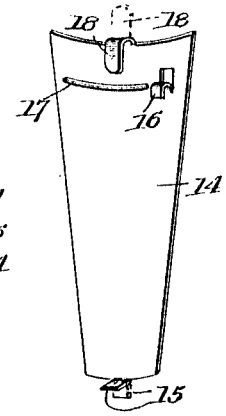
WITNESSES
INVENTOR
Howard A. Heyne
BY
ATTORNEYS ved Percolator, of which the following
UNITED STATES PATENT OFFICE.

HOWARD A. HEYNE, OF NEW YORK, N. Y., ASSIGNOR OF ONE-HALF TO WALTER L. DOUGLAS, OF NEW YORK, N. Y.

PERCOLATOR.

1,106,045.

Specification of Letters Patent.

Patented Aug. 4, 1914.

Application filed April 28, 1913. Serial No. 764,061.

*To all whom it may concern:*

Be it known that I, HOWARD A. HEYNE, a citizen of the United States, and a resident of the city of New York, borough of Brooklyn, in the county of Kings and State of New York, have invented a new and Improved Percolator, of which the following is a full, clear, and exact description.

Among the principal objects which the present invention has in view are: to provide a receptacle for ground coffee, adapted to be expanded and contracted to fit various sizes of coffee-pots; to provide a percolator of the character mentioned with a telescopic circulation tube; to provide a transparent cover for said receptacle, shaped to fit the same under various conditions of expansion thereof; and to simplify and minimize the cost of construction.

One embodiment of the present invention is shown in the accompanying drawings, in which—

Figure 1 is a vertical section of a coffee-pot of usual construction, shown as having applied thereto a percolator constructed and arranged in accordance with the present invention, the percolator being partly cut away to more clearly show the construction thereof; Fig. 2 is a top plan view of the ground-coffee cup and circulating tube therein; Fig. 3 is a detail view in perspective, showing the lower section of the circulating tube; Fig. 4 is a detail view, on an enlarged scale, showing one of the leaves forming the ground-coffee cup.

As seen in the accompanying drawings, the ground-coffee cup is provided with a perforated disk bottom 9. Fixedly attached to said bottom is a circulating tube 10. The tube 10 is extended upward through the center of the cup and above the upper edge thereof. The lower portion of the tube 10 extends below said bottom 9, and there receives and guides the telescopic section of the lower circulating tube 11. The tube 11 may be of any desired length, and is provided at the lower end thereof with a conical trap 12. The trap 12 is provided with a relatively enlarged open base. The sides forming the trap are outwardly extended at the lower edge to form a supporting or foot flange 13. The spread of the flange 13 is preferably sufficient to form a steadying support for the percolator when introduced into the coffee pot.

The cup is preferably circular in form and contracted at the lower end in resemblance to an inverted frusto-cone. The side wall of the cup is formed from a plurality of suitably shaped and suitably connected leaves 14. The leaves 14 are each provided at the lower end thereof with a tab 15, by which they are operatively connected to the bottom 9, slots being formed in said bottom to receive each of said tabs, which are bent, as shown by the broken line in Fig. 4 of the drawings, under the lower side of said bottom. The joint thus formed permits each leaf to rock on the bottom, an action necessary to the contraction and expansion of the upper edge of the cup. The leaves are each slidingly connected adjacent their upper edges with the two leaves adjacent to each. The connection therebetween is formed primarily by a lug 16 which is formed by cutting said lug from the material of the leaf and overturning the same at an angle substantially perpendicular to the face of the leaf 14. In line with the overturned portion of the lug, a slot 17 is cut in the leaf.

When connecting the leaves 14, the lug 16 of each is extended through the slot 17 of one of the adjacent leaves, while the lug 16 of the other adjacent leaf is extended through the slot 17 in the leaf referred to as having the lug. When the lugs are extended through the slots in the manner referred to, they are overturned, as shown best in Fig. 4 of the drawings, thereafter forming a freely-sliding connection between the leaves. The joint thus made is sufficiently free to permit the leaves to be expanded to their full capacity, while at the same time said joint is made sufficiently close to avoid a too free movement of the leaves. To support the cup in the pot, when in service, each of the leaves is further provided with a hanger section 18, adapted to rest upon and extend over the top edge of the pot.

The cover 19 is preferably constructed of glass, having a knob 20 for lifting said cover, and an inverted conical flange 21 the lower edge of which is contracted to a size approximating the size of the bottom 9. The incline of the flange 21 is relatively steep, it being the intention to support under all conditions the cover above the ground-coffee deposited in the cup. When the cover 19 is in service position, the upper end of the tube 10 extends within the flange 21. By this arrangement, all the steam which is carried up with the stream of liquid coffee is introduced within the hollow of the cover 19 and there condensed to drip backward on the inner walls of the flange 21 upon the ground coffee within the cup. The liquid coffee referred to passes from the bottom of the pot to the interior of the trap 12 by means of a relatively small inlet opening 22 (see Fig. 3 of the drawings).

The operation as a percolator of the present invention is substantially that of any apparatus of this character; that is to say, the liquid coffee or boiling water in the coffee-pot is delivered through the opening 22 to the interior of the trap 12, to be there heated or relatively superheated to rise upward through the tubes 11 and 10 to above the general level of the water or liquid in the coffee-pot and above the ground coffee in the cup. The boiling liquid percolates downward through the body of ground-coffee in said cup and passes therefrom to the perforated bottom 9, or, in the present instance, in part between the leaves 14. The objection to percolators heretofore urged has been that a purchaser has been compelled to discard a coffee-pot in his or her possession to purchase another having the percolating equipment, thereby incurring an unnecessary expenditure. The present invention is designed to overcome this objection by providing a percolator which may be adapted or attached to any coffee-pot which the purchaser may at the time of purchasing own. A further objection to percolators has existed in that the percolator has not adapted itself to the expansion often wished for in service, such as occasioned by accession to the household and where the household is provided with coffee-pots of different capacity. The equipment of the old percolator has prevented the transference from the smaller or larger coffee-pots, as the case may be, to one of different capacity and dimensions. This is overcome in the present invention, as the cup may be expanded to accommodate, within reasonable bounds, the top opening of any coffee-pot, and the cover 19 of the present cup will accommodate any expansion of said cup.

Claims:

1. A percolator, comprising a cup to hold ground coffee; a circulating tube extending upward through said cup from below the same; a perforated bottom for said cup; and a side wall for said cup, embodying a plurality of leaves operatively connected each with the other and each with said bottom, to move relative each other and said bottom, for expansion of the top opening of said cup.

2. A percolator, comprising a cup to hold ground coffee; a circulating tube extending upward through said cup from below the same; a perforated bottom for said cup; a side wall for said cup, embodying a plurality of leaves operatively connected with each other and with said bottom, to move relative to each other and said bottom, for expansion of the top opening of said cup; and a hollow cover for said cup, having a downwardly-contracted flange inclined to fit the upper edge of said cup under various conditions of expansion.

3. A percolator, comprising a cup to hold ground coffee; a circulating tube extending upward through said cup from below the same; a perforated bottom for said cup; a side wall for said cup, embodying a plurality of leaves operatively connected each with the other and each with said bottom to move relative to each other and said bottom, for expansion of the top opening of said cup; a hollow cover for said cup, having a downwardly-contracted flange inclined to fit the upper edge of said cup under various conditions of expansion; and a hollow conical member slidably connected with said tube, said member having inclined walls upwardly contracted, said walls having an opening adjacent the bottom thereof for admission of liquid thereto.

In testimony whereof I have signed my name to this specification in the presence of two subscribing witnesses.

HOWARD A. HEYNE.

Witnesses:
   E. F. MURDOCK,
   PHILIP D. ROLLHAUS.

---

Copies of this patent may be obtained for five cents each, by addressing the "Commissioner of Patents, Washington, D. C."